(12) United States Patent
Saito et al.

(10) Patent No.: US 6,530,218 B2
(45) Date of Patent: Mar. 11, 2003

(54) HYDROSTATIC CONTINUOUSLY VARIABLE TRANSMISSION

(75) Inventors: Mitsuru Saito, Saitama (JP); Yoshihiro Yoshida, Saitama (JP); Kazuhiro Takeuchi, Saitama (JP); Yasushi Fujimoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/867,396

(22) Filed: May 31, 2001

(65) Prior Publication Data

US 2002/0007630 A1 Jan. 24, 2002

(30) Foreign Application Priority Data

May 31, 2000 (JP) ........................ 2000-162367

(51) Int. Cl.$^7$ ............................................. F16D 31/02
(52) U.S. Cl. .......................................... 60/464; 60/489
(58) Field of Search .......................... 60/464, 487, 489, 60/494

(56) References Cited

U.S. PATENT DOCUMENTS

| | | | | |
|---|---|---|---|---|
| 3,704,588 A | * | 12/1972 | Trabbic | 60/489 X |
| 4,845,951 A | * | 7/1989 | Hayashi et al. | 60/488 |
| 4,887,428 A | * | 12/1989 | Iino | 60/468 |
| 5,058,382 A | * | 10/1991 | Inoue et al. | 60/488 |
| 5,060,477 A | * | 10/1991 | Hayashi et al. | 60/488 |
| 5,065,578 A | * | 11/1991 | Nakajima et al. | 60/464 |
| 5,575,151 A | * | 11/1996 | Hayashi et al. | 60/489 |
| 6,324,843 B1 | * | 12/2001 | Yasuda et al. | 60/489 |

FOREIGN PATENT DOCUMENTS

| | | | |
|---|---|---|---|
| JP | (B2)756340 | 4/1990 | |
| JP | (A) 4-203553 | 7/1992 | |

* cited by examiner

*Primary Examiner*—Edward K. Look
*Assistant Examiner*—John Ryznic
(74) *Attorney, Agent, or Firm*—Birch, Stewart, Kolasch & Birch, LLP

(57) ABSTRACT

A pressure regulating valve is provided in a hydrostatic, continuously variable transmission having a hydraulic closed circuit including a hydraulic pump, a hydraulic motor, and a high pressure oil passage and a low pressure oil passage disposed between the hydraulic pump and the hydraulic motor. The pressure regulating valve is provided for relieving the hydraulic pressure in the low pressure oil passage into the high pressure oil passage when the hydraulic pressure in the low pressure oil passage exceeds a predetermined value. The present invention prevents excessive pressure in the oil passages, particularly in the normally low pressure passage that serves as a high pressure side during a speed reducing operation, e.g. an engine braking or reverse load situation.

16 Claims, 6 Drawing Sheets

HYDROSTATIC CONTINUOUSLY VARIABLE TRANSMISSION

BACKGROUND OF THE INVENTION

1. Field of the Invention

The present invention relates to a hydrostatic continuously variable transmission, and more particularly to a hydrostatic continuously variable transmission for preventing an excessive increase in hydraulic pressure during speed reducing operations.

2. Description of the Background Art

A hydrostatic continuously variable transmission has been used for continuously variable transmissions for motorcycle and automobiles in the background art. Such a continuously variable transmission is described in Japanese Examined Patent Publication No. 7-56340 and Japanese Unexamined Patent Publication No. 4-203553. FIG. 6 is a schematic view of a hydrostatic continuously variable transmission according to the background art.

As shown in FIG. 6, this hydrostatic continuously variable transmission has a fixed displacement type swash plate hydraulic pump P connected to the crank shaft side of an engine and a variable displacement type swash plate hydraulic motor M connected to a driving wheel side of an engine. The hydraulic pump P and the hydraulic motor M are connected to each other to form a hydraulic closed circuit via an inside oil passage (low pressure passage) 52.

The inside oil passage 52 is a low pressure passage in a normal load operation, but is a high pressure passage in a speed reducing operation, or a reverse load operation. An outside oil passage (high pressure passage) 53 is a high pressure passage in a normal load operation, but is a low pressure passage in the reverse load operation. An oil supply passage 47 connected to an oil supply pump 88 pumping oil from an oil reservoir 87 is connected to the inside oil passage 52 via a first check valve 95 and is connected to the outside oil passage 53 via the second check valve 96.

A pressure regulating valve 97 is disposed between the outside oil passage 53 and the inside oil passage 52. In a normal operation, e.g. an acceleration operation, if the hydraulic pressure in the outside oil (high pressure) passage 53 is larger than a predetermined value, the pressure regulating valve 97 introduces part of the hydraulic oil in the outside oil passage 53 into the inside oil passage 52 to prevent an excessive pressure in the outside oil passage 53.

In a hydrostatic continuously variable transmission having the configuration described above, when the gear is operated in a reverse load, e.g. the engine acts as a brake, the gear is driven by the wheels. Accordingly, the hydraulic motor M acts as a hydraulic pump and the hydraulic pump acts as a hydraulic motor. The outside oil passage 53 becomes a low pressure oil passage and the inside oil passage 52 becomes a high pressure oil passage.

In particular, when a vehicle jumps and lands on the ground, the pressure in the inside oil passage 52 increases excessively. This excessive increase in the pressure in the inside oil passage 52 requires an increase in the size of the transmission.

SUMMARY OF THE INVENTION

The present invention overcomes the shortcomings associated with the background art and achieves other advantages not realized by the background art.

The present invention has been made in view of the realization that hydrostatic continuously variable transmissions of the background art can prevent an excessive increase in the hydraulic oil during normal operations, but are not protected against excessive pressures during speed reducing operations.

An aspect of the present invention is to prevent excessive pressure buildup in the low pressure side of a hydrostatic continuously variable transmission during all modes of operation.

These and other aspects of the present invention are accomplished by a hydrostatic continuously variable transmission comprising a hydraulic pump; a hydraulic motor; a high pressure oil passage disposed between the hydraulic pump and the hydraulic motor, the high pressure oil passage sending hydraulic oil to the hydraulic motor from the hydraulic pump during a normal operation of the transmission; a low pressure oil passage disposed between the hydraulic pump and the hydraulic motor, the low pressure oil passage sending hydraulic oil to the hydraulic pump from the hydraulic motor during the normal operation, and wherein the high and low pressure passages, the hydraulic pump and the hydraulic motor form a hydraulic closed circuit having a hydraulic pressure; and a pressure regulating valve for relieving the hydraulic pressure in the low pressure oil passage to the high pressure oil passage when the hydraulic pressure in the low pressure oil passage exceeds a predetermined value.

These and other aspects of the present invention are further accomplished by a hydrostatic continuously variable transmission comprising a hydraulic pump; a hydraulic motor; a cylinder block integrally formed by the hydraulic pump and the hydraulic motor; a hollow output shaft; a high pressure oil passage disposed between the hydraulic pump and the hydraulic motor, the high pressure oil passage sending hydraulic oil to the hydraulic motor from the hydraulic pump during a normal operation of the transmission; a low pressure oil passage disposed between the hydraulic pump and the hydraulic motor, the low pressure oil passage sending hydraulic oil to the hydraulic pump from the hydraulic motor during the normal operation, and wherein the high and low pressure passages, the hydraulic pump and the hydraulic motor form a hydraulic closed circuit having a hydraulic pressure; and a pressure regulating valve for relieving the hydraulic pressure in the low pressure oil passage to the high pressure oil passage when the hydraulic pressure in the low pressure oil passage exceeds a predetermined value.

According to the hydrostatic continuously variable transmission having the above-mentioned configuration, even when the hydraulic pressure in a hydraulic circuit increases when the hydraulic motor acts as a hydraulic pump, e.g. when a vehicle is decelerated and reverse loading is experienced, the pressure regulating valve is opened to introduce hydraulic oil in the low pressure oil passage to a high pressure oil passage. Therefore, an excessive increase in the low pressure oil passage is prevented without a need to increase the size and capacity of the oil passages.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
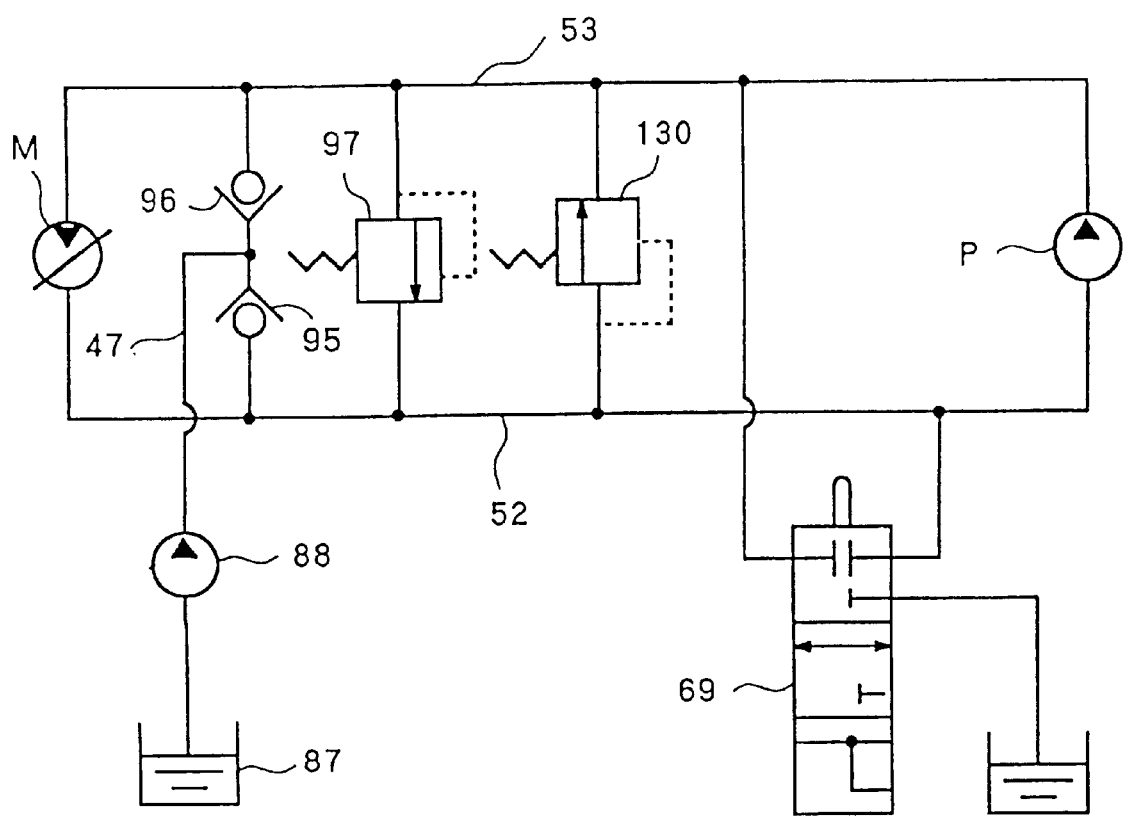
FIG. 1 is a schematic view of a hydrostatic continuously variable transmission according to an embodiment of the present invention.
Figure 2:
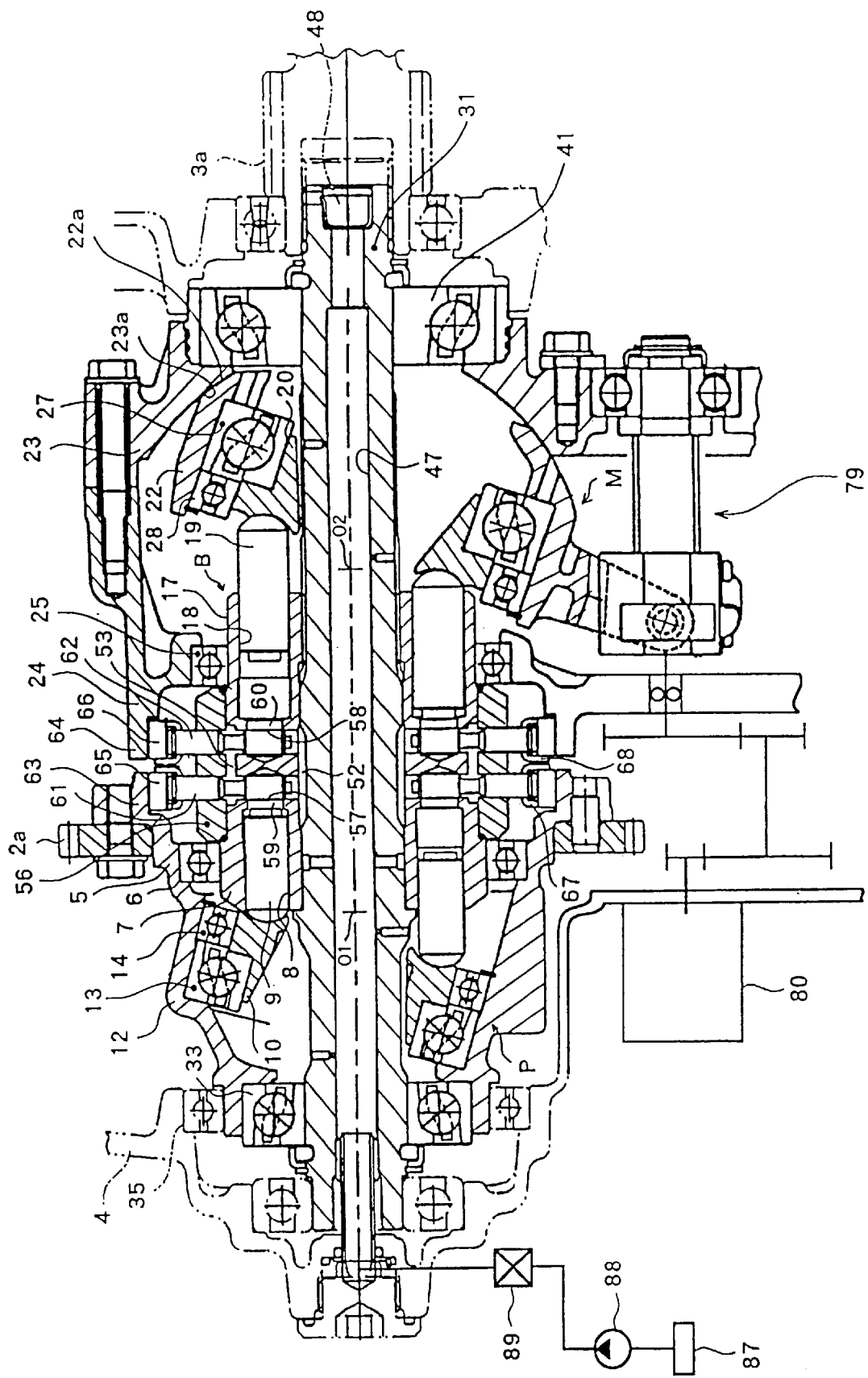
FIG. 2 is a longitudinal cross-sectional view of a hydrostatic continuously variable transmission according to an embodiment of the present invention applied to a power unit of a vehicle.
Figure 3:
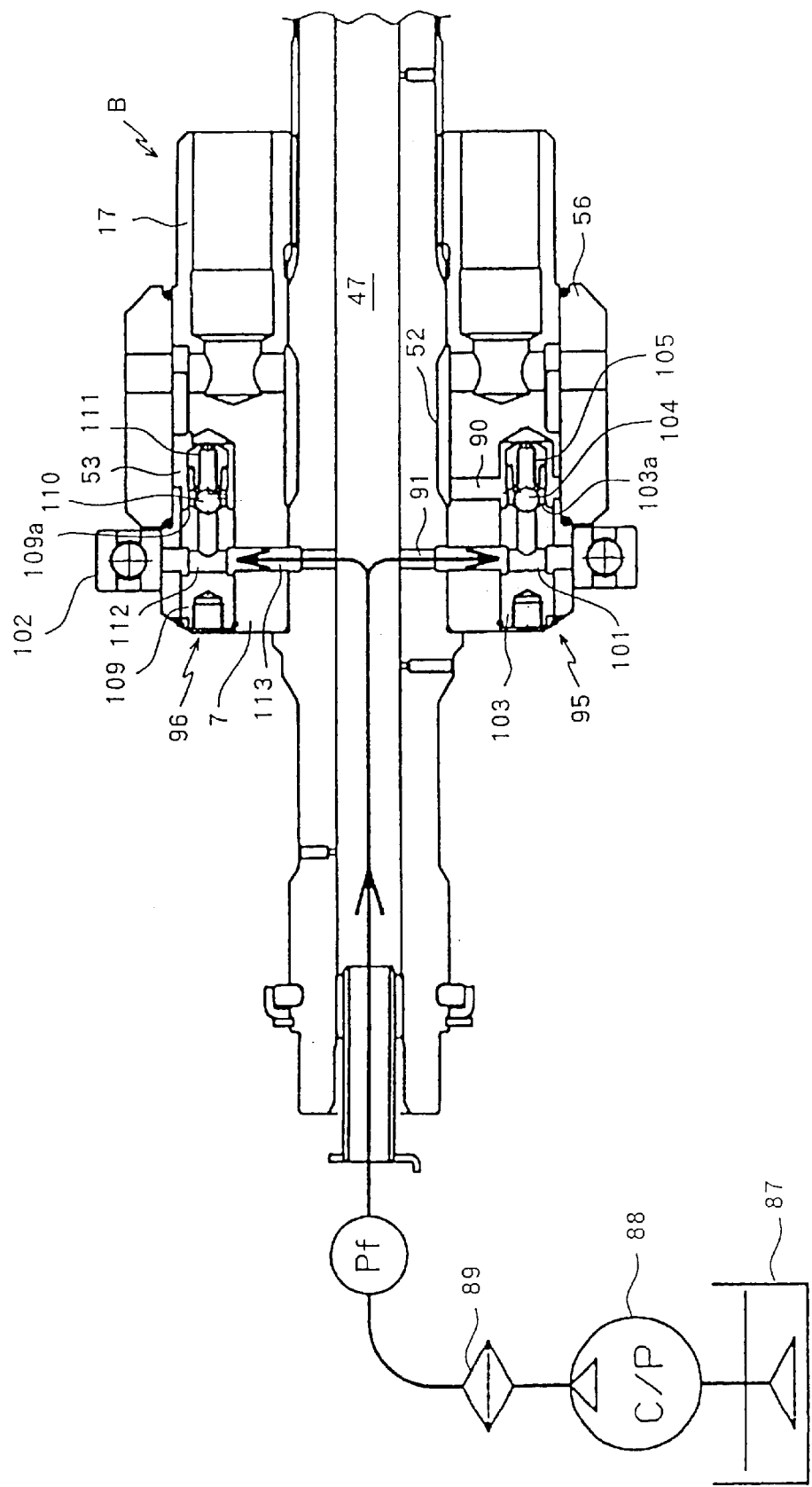
FIG. 3 is a longitudinal cross-sectional view of a check valve of the embodiment shown in FIG. 2.
Figure 4:
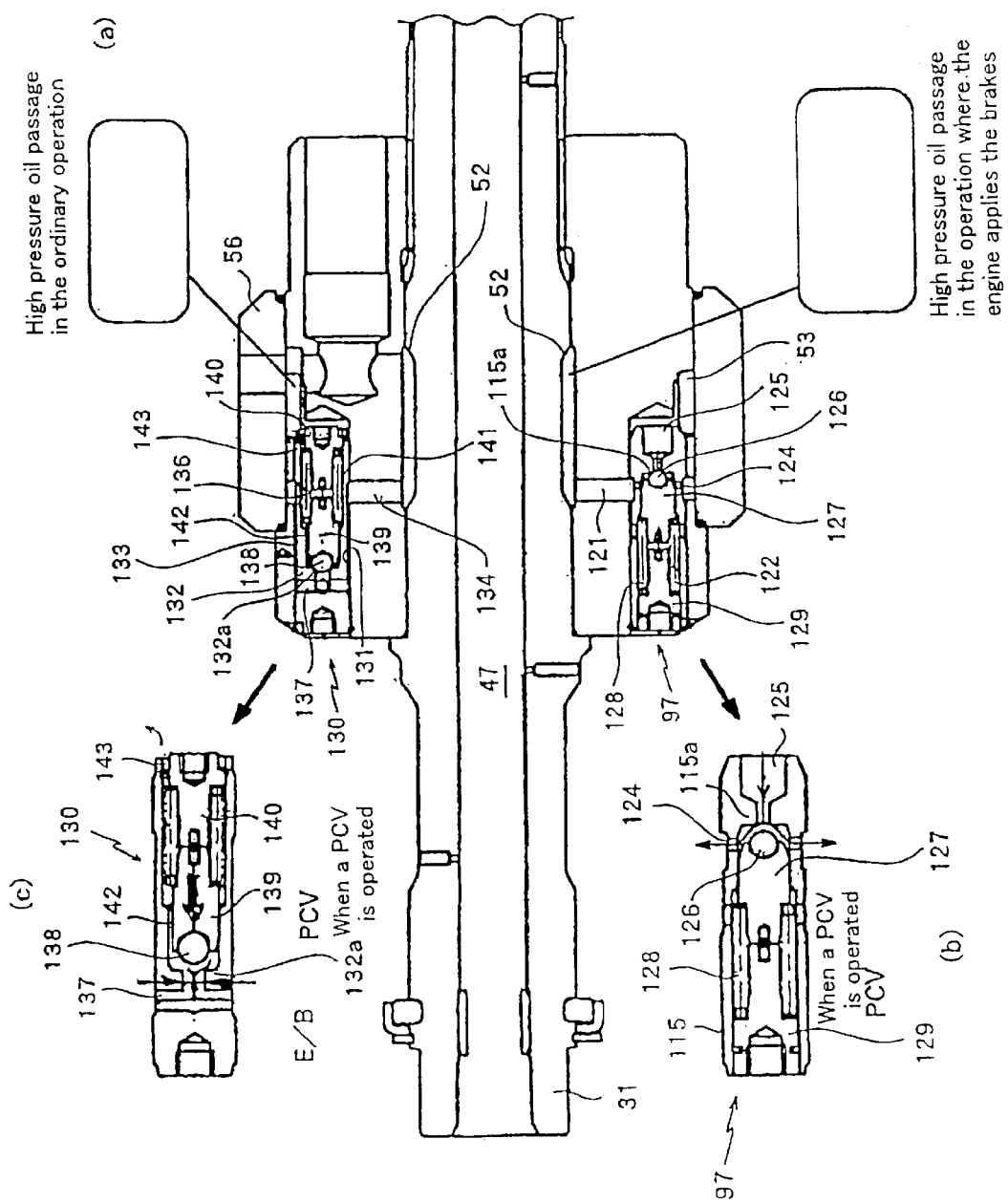
FIG. 4 is a longitudinal cross-sectional view of a pressure regulating valve of the embodiment shown in FIG. 2.
Figure 5:
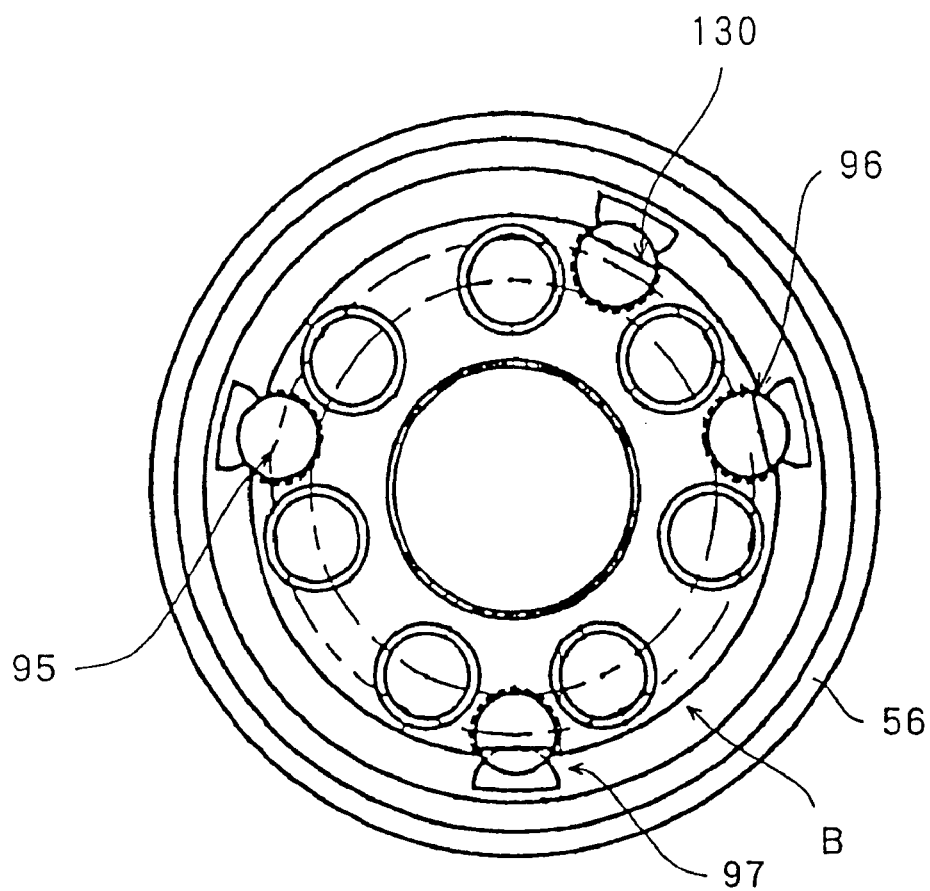
FIG. 5 is a side view showing an arrangement of valves in the preferred embodiment shown in FIG. 2.
Figure 6:
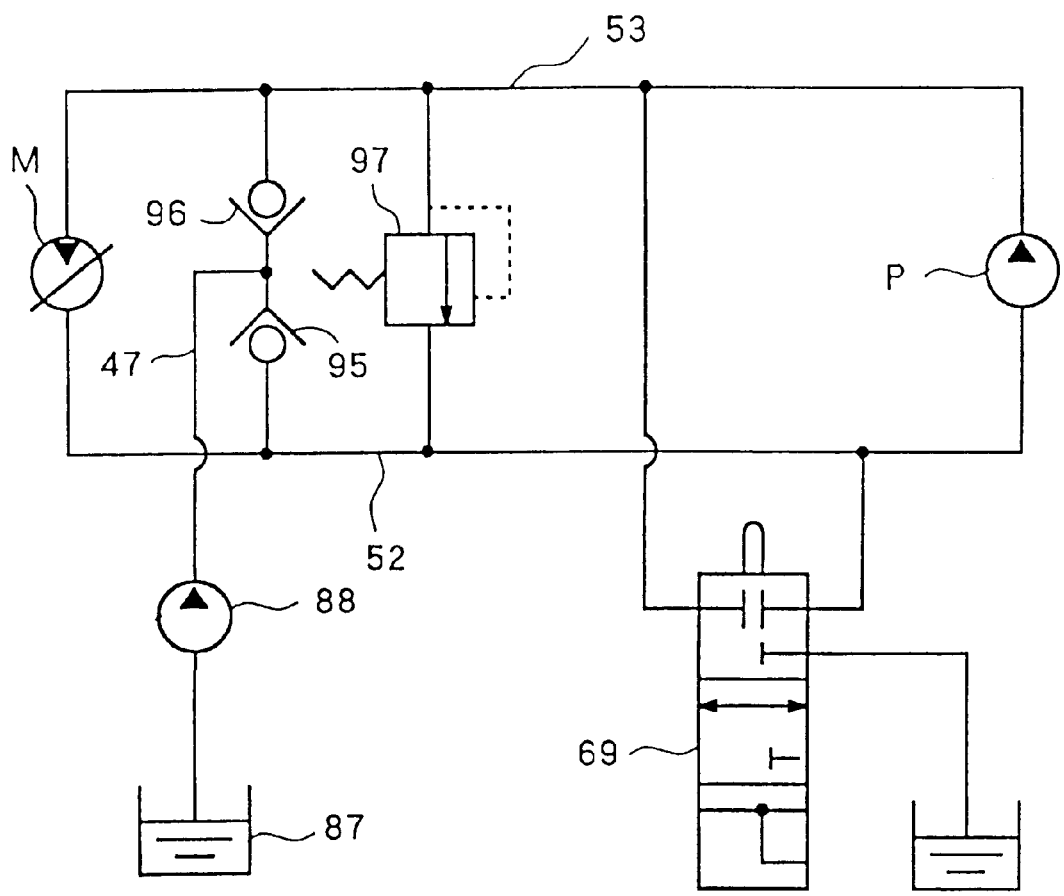
FIG. 6 is a schematic view of a hydrostatic continuously variable transmission according to the background art.

The present invention will hereinafter be described with reference to the accompanying drawings. FIG. 1 is a schematic view of a hydrostatic continuously variable transmission according to an embodiment of the present invention. FIG. 2 is a longitudinal cross-sectional view of a hydrostatic continuously variable transmission according to an embodiment of the present invention applied to a power unit of a vehicle. FIG. 3 is a longitudinal cross-sectional view of a check valve of the embodiment shown in FIG. 2. FIG. 4 is a longitudinal cross-sectional view of a pressure regulating valve of the embodiment shown in FIG. 2. FIG. 5 is a side view showing an arrangement of valves in the preferred embodiment shown in FIG. 2.

As shown in FIG. 1, much of the structure of the hydrostatic continuously variable transmission in accordance with the present invention is the same as that of a conventional hydrostatic continuously variable transmission. The hydrostatic continuously variable transmission in accordance with the present invention includes a fixed displacement type swash plate hydraulic pump P connected to the crank shaft side of an engine (not shown) and a variable displacement type swash plate hydraulic motor M connected to a speed reduction gear side of the engine (not shown).

The hydraulic pump P is connected to the hydraulic motor M via an inside oil passage (low pressure oil passage) 52, which is a low pressure passage during a normal operation, but serves as a high pressure oil passage during a speed reducing operation, e.g. during a reverse load operation. An outside oil passage (high pressure oil passage) 53 is a high pressure oil passage during the normal operation, but serves as a low pressure oil passage during the reverse load operation. The oil passages 52, 53, hydraulic pump P and hydraulic motor M form a closed hydraulic circuit. An oil supply passage 47, connected to an oil supply pump 88 pumping oil from an oil reservoir 87, is connected to the inside oil passage 52 via a first check valve 95 and to the outside oil passage 53 via a second check valve 96.

A pressure regulating valve 97 is disposed between the outside oil passage 53 and the inside oil passage 52. When the hydraulic pressure in the outside oil passage 53 (high pressure passage) is larger than a predetermined value in the normal operation, e.g. during an acceleration operation, the pressure regulating valve 97 introduces part of the hydraulic oil located in the outside oil passage 53 (high pressure passage) into the inside oil passage 52 (low pressure passage) to prevent an excessive pressure in the outside oil passage 53.

In addition to the configuration described above, a second pressure regulating valve 130 is disposed between the outside oil passage 53 and the inside oil passage 52. When the pressure in the inside oil passage 52 (low pressure passage in the normal operation) is larger than a predetermined value during the reverse operation (low pressure passage now serves as high pressure passage), e.g. during the speed reducing operation or engine braking operation, the pressure regulating valve 130 introduces part of the hydraulic oil in the inside oil passage 52 into the outside oil passage 53 to prevent an excessive increase in hydraulic pressure in the inside oil passage 52.

Next, the configuration of a hydrostatic continuously variable transmission in accordance with a preferred embodiment will be described in greater detail.

In FIG. 2, a swash plate hydraulic pump P includes an input cylindrical shaft 5 provided with an output gear 2a of a first speed reduction gear; a pump cylinder 7 relatively rotatably supported by an inside peripheral wall of the input cylindrical shaft 5 via a ball bearing 6; and a plurality of cylinder bores 8 formed in the pump cylinder 7 in an annular arrangement such that they surround a rotary axis of the pump cylinder 7.

The pump P also includes a plurality of pump plungers 9 slidably fitted in the respective cylinder bores 8; a plate 10 having a front surface engaged with and put into contact with outside ends of the respective pump plungers 9; and a pump swash plate 12 for supporting the plate 10 via an angular contact bearing 13 and a radial bearing 14 so as to hold the plate 10 in a state tilted at a predetermined angle with respect to the axis of the pump cylinder 7 around an imaginary trunnion axis O1 intersecting the axis of the pump cylinder 7 at right angles.

The pump swash plate 12 is integrally formed with the input cylindrical shaft 5. When the input cylindrical shaft 5 is rotated, the pump swash plate 12 described above reciprocates the pump plungers 9 via the plate 10 and the bearings 13, 14 to make them repeat a suction stroke and a discharge stroke.

The hydraulic motor M includes a motor cylinder 17 integrally formed with the pump cylinder 7 described above and positioned at the right side in FIG. 2 on the same axis as the pump cylinder 7. The motor M includes a plurality of cylinder bores 18 formed in the motor cylinder 17 such that they surround the rotary axis of the motor cylinder 17; a plurality of motor plungers 19 slidably fitted in the respective cylinder bores 18; and a plate 20 whose front surface is engaged with and put into contact with the outside ends of the respective motor plungers 19.

A motor swash plate 22 for supporting the plate 20 via an angular contact bearing 27 and a radial bearing 28 and a motor swash plate anchor 23 for supporting the back surface of the motor swash plate 22 are also provided within the motor M.

The opposed contact surfaces 22a and 23a of the motor swash plate 22 and the motor swash plate anchor 23 which are put into contact with each other are formed having a spherical surface with a center at an intersection of the axis of the motor cylinder 17 and a trunnion axis O2. Further, the motor swash plate 22 is supported by the motor swash plate anchor 23 so that it can relatively rotate around the trunnion axis O2.

A cylindrical cylinder holder 24 is connected to the motor cylinder side end of the motor swash plate anchor 23. A ball bearing 25 is interposed between the cylinder holder 24 and the outer periphery of the motor cylinder 17.

The motor swash plate 22 is moved between a vertical position (positioned at right angles) and a maximum tilt position (tilted at a predetermined angle with respect to the axis of the motor cylinder 17) when the motor swash plate 22 is rotated around the trunnion axis O2 by a ball screw mechanism 79 connected to a motor 80. When the motor swash plate 22 is tilted, it can reciprocate the motor plungers 19 to make them repeat a suction stroke and a discharge stroke as the motor cylinder 17 is rotated.

The pump cylinder 7 and the motor cylinder 17 are integrally combined with each other to form a cylinder block B which is integrally formed with an output shaft 31. One side of the output shaft 31 extends beyond the boundary of the cylinder block B and passes through the plate 10 and the pump swash plate 12 to support the end portion of the pump swash plate 12 via the angular contact ball bearing 33. A ball bearing 35 is disposed between the pump swash plate 12 and a casing 4.

The other side of the output shaft 31 extends beyond the boundary of the cylinder block B and passes through the plate 20, the motor swash plate 22, and the motor swash plate anchor 23. The motor swash plate anchor 23 is supported by the output shaft 31 at the end side of the output shaft 31 (at the right end side in FIG. 2) via an angular contact ball bearing 41. The motor swash plate anchor 23 is integrally formed with the casing 4. An input gear 3a of a second speed reduction gear is mounted on the outer periphery of the output shaft 31 at the outside in the axial direction of the output shaft 31.

The inside of the hollow output shaft 31 integral with the cylinder block B forms an oil supply passage 47. The oil supply passage 47 is connected to an oil reservoir 87 at one end of the output shaft 31 (at the left end side in FIG. 2) via an oil filter 89 and an oil supply pump 88. At the other end of the output shaft 31, the oil supply passage 47 is closed with a plug 48 or is opened with a restrictor.

An annular groove is formed on the outer peripheral surface of the output shaft 31 between the group of cylinder bores 8 of the pump cylinder 7 and the group of cylinder bores 18 of the motor cylinder 17 to form an annular inside oil passage 52 between the outer peripheral surface of the output shaft 31 and the inner peripheral surface of the cylinder block B integrally fitted on the output shaft 31. Further, an annular groove is formed on the outer peripheral surface of the cylinder block B to form an annular outside oil passage 53 between the outer peripheral surface of the cylinder block B and the inner peripheral surface of a ring body 56 integrally fitted on the outer peripheral surface of the cylinder block B.

First valve bores 57 are radially formed in the annular partition wall between the inside oil passage 52 and the outside oil passage 53 of the cylinder block B at the group of the cylinder bores 8 side. The first valve bores 57 are formed between the group of cylinder bores 8 of the pump cylinder 7 and the group of cylinder bores 18 of the motor cylinder 17 and in the outer peripheral wall of the outside oil passage 53, e.g. in the ring body 56. The number of the first valve bores is equal to the number of the cylinder bores 8.

Second valve bores 58 are radially formed in the annular partition wall between the inside oil passage 52 and the outside oil passage 53 of the cylinder block B at the group of the cylinder bores 18 side. The second valve bores 58 are formed between the group of cylinder bores 8 of the pump cylinder 7 and the group of cylinder bores 18 of the motor cylinder 17 and in the outer peripheral wall of the outside oil passage 53, e.g. in the ring body 56. The number of the second valve bores is equal to that of the cylinder bores 18.

The pump cylinder bores 8 communicate with their respective first valve bores 57 through respective pump ports 59 and the motor cylinder bores 18 communicate with their respective second valve bores 58 through respective motor ports 60.

A plurality of first distributor valves 61 (spool type) are slidably fitted in the respective first valve bores 57 and a plurality of second distributor valves 62 (spool type) are slidably fitted in the second valve bores 58. A first eccentric ring (eccentric cam) 63 surrounding the first distributor valves 61 is engaged with the outside ends of the first distributor valves 61 via a slip ring (or a ball bearing) 65. A second eccentric ring (eccentric cam) 64 surrounding the second distributor valves 62 is engaged with the outside ends of the second distributor valves 62 via a slip ring (or a ball bearing) 66.

The outside ends of the first distributor valves 61 are combined with each other by a first expansion ring 67 concentric with the first eccentric ring 63 and the outside ends of the second distributor valves 62 are combined with each other by a second expansion ring 68 concentric with the second eccentric ring 64.

The first eccentric ring 63 is integrally formed with the input cylindrical shaft 5 and is positioned eccentrically by a predetermined distance $\epsilon 1$ from the center of the cylinder block B along the tilt center (imaginary trunnion axis O1) of the pump swash plate 12. Also, the second eccentric ring 64 is connected to the cylinder holder 24 and is positioned eccentrically by a predetermined distance $\epsilon 2$ from the center of the cylinder block B along the tilt center (imaginary trunnion axis O2) of the motor swash plate 20.

When a relative rotation is produced between the input cylindrical shaft 5 and the pump cylinder 7, e.g. the cylinder block B, the respective first distributor valves 61 are reciprocated by the first eccentric ring 63 between the inside positions and the outside positions in the radial direction of the pump cylinder 7 with a stroke of two times the amount of eccentricity cl in the first valve bore 57.

In the discharge region of the hydraulic pump P, the first distributor valve 61 is moved to the inside position to make the corresponding pump port 59 communicate with the outside oil passage 53 and to shut the communication between the pump port 59 and the inside oil passage 52. The hydraulic oil is then pressure-fed to the outside oil passage 53 from the cylinder bore 8 by the pump plunger 9 in a discharge stroke.

Also, in the suction region of the hydraulic pump P, the first distributor valve 61 is moved to the outside position side to make the corresponding pump port communicate with the inside oil passage 52 and to shut the communication between the pump port 59 and the outside oil passage 53. The hydraulic oil is sucked into the cylinder bore 8 from the inside oil passage 52 by the pump plunger 9 in a suction stroke.

When the motor cylinder 17, e.g. the cylinder block B, is rotated, the respective second distributor valves 62 are reciprocated by the second eccentric ring 64 between their inside positions and their outside positions in the radial direction of the cylinder block B with a stroke of two times the amount of eccentricity $\epsilon 2$ in the second valve bore 58.

In the expansion region of the hydraulic motor M, the second distributor valve 62 is moved to the inside position to make the corresponding motor port 60 communicate with the outside oil passage 53 and to shut the communication between the motor port 60 and the inside oil passage 52. The high pressure hydraulic oil is supplied to the cylinder bore 18 of the motor plunger 19 in an expansion stroke from the outside oil passage 53.

Also, in the contraction region of the hydraulic motor M, the second distributor valve 62 is moved to the outside position side to make the corresponding motor port 60 communicate with the inside oil passage 52 and to shut the communication between the motor port 60 and the outside oil passage 53. The hydraulic oil is discharged into the inside oil passage 52 from the cylinder bore 18 of the motor plunger 19 in a contraction stroke.

Accordingly, the cylinder block B is rotated by the sum of a reactive torque which is applied to the pump cylinder 7 by the pump swash plate 12 via the pump plunger 9 in the discharge stroke and a reactive torque which is applied to the motor cylinder 17 by the motor swash plate 22 via the motor plunger 19 in the expansion stroke. The rotational torque is transmitted to the second speed reduction gear by the output shaft 31.

In this case, the speed change ratio of the output shaft 31 to the input cylindrical shaft 5 is given by the following equation:

Speed change ratio=1+(displacement of hydraulic motor M/displacement of hydraulic pump P)

Therefore, if the displacement of the hydraulic motor M is changed to a certain value different than zero, the speed change ratio can be changed from 1 to a certain necessary value. Further, since the displacement of the hydraulic motor M is determined by the stroke of the motor plunger 19, the speed change ratio can variably be controlled from 1 to a certain value by tilting the motor swash plate 22 from a vertical position (zero value) to a certain tilt position.

Next, check valves 95, 96 provided in the cylinder block B will be described with reference to FIG. 3 through FIG. 5. A communication hole 90 communicating with the inside oil passage 52 and a communication hole 91 communicating with the oil supply passage 47 are formed in the cylinder block B. A first check valve 95 for preventing hydraulic oil from reversely flowing to the oil supply passage 47 from the inside oil passage 52 is disposed between these communication holes 90, 91.

The first check valve 95 includes a valve body 103 having an oil passage 101 for connecting the communication holes 90, 91, a spherical valve element 104 contacting with a valve seat 103a provided on the valve body 103, and a valve spring 105 for applying a spring force to the valve element 104 to press the valve element 104 onto the valve seat 103a.

A communication hole 113 communicating with the oil supply passage 47 is formed in the cylinder block B and a second check valve 96 for preventing the hydraulic oil from reversely flowing to the oil supply passage 47 from the outside oil passage 53 is provided between the communication hole 113 and the outside oil passage 53. The second check valve 96 includes a valve body 109 having an oil passage 112 for connecting the communication hole 113 to the outside oil passage 53, a spherical valve element 110 contacting with a valve seat 109a provided on the valve body 109, and a valve spring 111 for applying a spring force to the valve element 110 to press the valve element 110 onto the valve seat 109a.

An opening made in the pump cylinder 7 from the outer periphery thereof so as to form the communication holes 91, 113 is sealed by the inner peripheral surface of the inner race of a bearing 102. Hence, this can eliminate the need for a specific part/component to seal the opening and consequently reduces the number of parts and results in reducing manufacturing costs.

As seen in FIG. 4, a communication hole 121 communicating with the inside oil passage 52 is formed in the cylinder block B and a pressure regulating valve 97 for preventing an excessive increase in pressure in the outside oil passage 53 is disposed between the communication hole 121 and the outside oil passage 53.

The pressure regulating valve 97 has a valve chest 122 therein and includes a second communication hole 124 for connecting the valve chest 122 to the first communication hole 121, a valve body 115 having a passage 125 for connecting the valve chest 122 to the outside oil passage 53, a movable body 127 for holding a spherical valve element 126 contacting with a valve seat 115a formed on the valve body 115, a fixed member 129 provided on the valve body 115, and a valve spring 128 disposed between the fixed member 129 and the movable body 127 so as to put the valve element 126 into contact with the valve seat 115a.

In the pressure regulating valve 97, hydraulic pressure in the outside oil passage 53 is applied to the valve element 126 to give the valve element 126 a valve opening force. In an ordinary operating state, where the hydraulic pressure in the outside oil passage 53 does not exceed a predetermined value, the force of the valve spring 128 urging the valve element 126 in the direction that closes the valve is larger than the above-mentioned valve opening force.

Accordingly, as shown in FIG. 4(*a*), the valve element 126 is held in the state where the valve is closed, e.g. in the sate where communication between the passage 125 communicating with the outside oil passage 53 and the communication hole 124 communicating with the inside oil passage 52 is prevented. When the hydraulic pressure in the outside oil passage 53 is larger than the predetermined value, since the valve opening force is larger than the force of the valve spring 128, as shown in FIG. 4(*b*), the valve element 126 and the movable body 127 slide while compressing the valve spring 128.

When the valve element 126 is separated from the valve set 115a, the passage 125 communicating with the outside oil passage 53 is brought into communication with the communication hole 124 communicating with the inside oil passage 52 to discharge the excessive amount of oil in the outside oil passage 53 into the inside oil passage 52 via the communication hole 125, the valve chest 122, and the communication holes 124, 121.

When the hydraulic pressure in the outside oil passage 53 returns to the ordinary operating state, the valve element 126 is returned to the closed state shown in FIG. 4(*a*) by the spring force of the valve spring 128. Therefore, an excessive increase in hydraulic pressure in the outside oil passage 53 is prevented even when a vehicle is rapidly started or rapidly accelerated.

As described above, in order to prevent a malfunction caused when the hydraulic pressure in the inside oil passage 52 becomes larger than the predetermined valve in the reverse operation, e.g. in the speed reducing operation, the pressure regulating valve (relief valve) 130 introduces part of the hydraulic oil in the inside oil passage 52 into the outside oil passage 53 during engine braking operations.

A valve bore 131 is made in parallel to the output shaft 31 in the cylinder block B and a valve body 132 of the pressure regulating valve 130 (for engine braking) is fitted in the valve bore 131. An annular oil passage 133 is formed between the outer peripheral surface of the valve body 132 fitted in the valve bore 131 and the inner peripheral surface of the valve bore 131. A communication hole 134 is formed in the cylinder block B for connecting the annular oil passage 133 to the inside oil passage 52.

A valve chest 136 is formed in the valve body 132 of the pressure regulating valve 130. A communication hole 137 for connecting the valve chest 136 to the annular oil passage 133 is also provided. In the valve chest 136, a movable body 139 is stored for holding a spherical valve element 138 in contact with a valve seat 132a formed on the valve chest 136 side of the valve body 132. A valve spring 141 for applying a spring force to the valve element 138 to put the valve element 138 into contact with the valve seat 132a is disposed between a fixed member 140 provided on the valve body 132 and the movable body 139.

An oil passage 142 is formed between the movable body 139 and the valve body 132, and an oil passage 143 is also formed between the fixed body 140 and the valve body 132 and communicates with the outside oil passage 53. When the valve element 138 is separated from the valve seat 132a, the inside oil passage 52 is brought into communication with the outside oil passage 53 via the communication hole 134, the annular oil passage 133, the communication hole 137 of the valve body 132, and the oil passages 142, 143.

In the pressure regulating valve 130, a valve opening force is applied to the valve body 138 by the hydraulic pressure in the inside oil passage 52. In the ordinary operating state where the hydraulic pressure in the inside oil passage 52 does not exceed the predetermined value, the valve body 138 is held in the state where the valve is closed, e.g. in the state where communication between the communication hole 137 communicating with the inside oil passage 52 and the oil passage 142 communicating with the outside oil passage 53 is prevented. The force of the valve spring 141 urging the valve element 138 in the direction that closes the valve is larger than the valve opening force, as shown in FIG. 4(a), thereby forcing the valve body 138 closed.

When the hydraulic pressure in the inside oil passage 52 is larger than the predetermined value during the reverse operation, e.g. in the operation where the engine brake is used, the valve opening force becomes larger than the force of the valve spring 141. Accordingly, as shown in FIG. 4(c), when the valve element 138 and the movable body 139 move while compressing the valve spring 141, and when the valve element 138 is separated from the valve seat 132a, the passage 137 communicating with the inside oil passage 52 is brought into communication with the oil passages 142, 143 communicating with the outside oil passage 53.

The excessive amount of hydraulic oil in the inside oil passage 52 is discharged into the outside oil passage 53 via the communication hole 134, the annular oil passage 133, the communication hole 137 made in the valve body 132, and the oil passages 142, 143. Therefore, an increase in pressure in the inside oil passage 52 can be prevented. When the hydraulic pressure in the inside oil passage 52 is returned to the ordinary state, the valve element 138 is returned to the closed state shown in FIG. 4(a) by the spring force of the valve spring 141.

While an example in which the pressure regulating valve 130 is built in the cylinder block B has been described in the above preferred embodiment, the pressure regulating valve 130 may be provided, for example, in a valve cylinder made in the output shaft.

According to the hydrostatic continuously variable transmission of the present invention, a hydraulic closed circuit includes a hydraulic pump, a hydraulic motor, a high pressure oil passage which is disposed between the hydraulic pump and the hydraulic motor and sends hydraulic oil to the hydraulic motor side from the hydraulic pump side, and a low pressure oil passage which is disposed between the hydraulic pump and the hydraulic motor and sends hydraulic oil to the hydraulic pump side from the hydraulic motor side. A pressure regulating valve for relieving the hydraulic pressure in the low pressure oil passage to the high pressure oil passage when the hydraulic pressure in the low pressure oil passage exceeds a predetermined value is also provided in the hydraulic circuit.

Accordingly, even when the hydraulic pressure in the hydraulic circuit which is the low pressure side in the normal operation becomes higher than a predetermined value, a relief valve is opened to introduce hydraulic oil into the high pressure oil passage (high pressure side during normal operation). The high pressure oil passage serves as a low pressure side during the speed reducing operations, whereby an excessive increase in hydraulic pressure in the low pressure oil passage is prevented by relief of excessive pressure to the high pressure side.

In particular, when a vehicle jumps slightly and lands on the ground, e.g. when traveling on rough or off-road terrain, an excessive increase in the hydraulic pressure in the continuously variable transmission can be prevented that thereby eliminates the possibility of a malfunction in the continuously variable transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydrostatic continuously variable transmission comprising:
   a hydraulic pump including a pump cylinder and a plurality of pump cylinder bores;
   a hydraulic motor including a motor cylinder and a plurality of motor cylinder bores;
   a cylinder block having an output shaft, wherein said pump cylinder and said motor cylinder form the cylinder block;
   a high pressure oil passage disposed between the hydraulic pump and the hydraulic motor, said high pressure oil passage sending hydraulic oil to the hydraulic motor from the hydraulic pump during a normal operation of the transmission;
   a low pressure oil passage disposed between the hydraulic pump and the hydraulic motor, said low pressure oil passage sending hydraulic oil to the hydraulic pump from the hydraulic motor during the normal operation, and wherein said high and low pressure passages, said hydraulic pump and said hydraulic motor form a hydraulic closed circuit having a hydraulic pressure;
   a first pressure regulating valve for relieving the hydraulic pressure in the low pressure oil passage to the high pressure oil passage when the hydraulic pressure in the low pressure oil passage exceeds a predetermined value; and
   a second pressure regulating valve for relieving the hydraulic pressure in the high pressure oil passage to the low pressure oil passage when the hydraulic pressure in the low pressure oil passage exceeds a predetermined value, wherein the first and the second pressure regulating valves are formed in the cylinder block in parallel with the pump and motor cylinder bores.

2. The hydrostatic continuously variable transmission according to claim 1, wherein said hydraulic pump is a swash plate hydraulic pump.

3. The hydrostatic continuously variable transmission according to claim 1, wherein said hydraulic pump includes a motor swash plate.

4. The hydrostatic continuously variable transmission according to claim 1, said hydraulic pump including
an input cylindrical shaft, the pump cylinder rotatably supported by said input cylindrical shaft,
a plurality of pump plungers slidably fitted in said pump cylinder bores,
a plate having a front surface engaged with a plurality of outside ends of the respective pump plungers, and
a pump swash plate for supporting the plate.

5. The hydrostatic continuously variable transmission according to claim 4, said hydraulic pump further including
an angular contact bearing,
a radial contact bearing, wherein said angular contact bearing and said radial contact bearing hold the plate having the front surface at a predetermined tilt angle.

6. The hydrostatic continuously variable transmission according to claim 5, wherein said predetermined tilt angle is defined with respect to an axis of the pump cylinder around an imaginary trunnion axis intersecting the axis of the pump cylinder at right angles.

7. The hydrostatic continuously variable transmission according to claim 6, wherein the hydraulic motor includes a motor cylinder integrally formed with the pump cylinder and along the axis of the pump cylinder.

8. The hydrostatic continuously variable transmission according to claim 1, said hydraulic motor including
a plurality of motor plungers slidably fitted in the respective cylinder bores,
a plate having a front surface engaged with a plurality of outside ends of said motor plungers, and
a motor swash plate supporting the plate.

9. The hydrostatic continuously variable transmission according to claim 8, said hydraulic motor further including
an angular contact bearing,
a radial bearing, wherein said angular contact bearing and said radial bearing support said plate having the front surface, and
a motor swash plate anchor supporting a back surface of said motor swash plate.

10. The hydrostatic continuously variable transmission according to claim 9, wherein respective, opposed contact surfaces of the motor swash plate and motor swash plate anchor are formed having integral, spherical surfaces with a common center at an intersection of an axis of the motor cylinder and a trunnion axis.

11. The hydrostatic continuously variable transmission according to claim 1, further comprising:
a plurality of check valves for preventing reverse flowing of hydraulic oil.

12. A hydrostatic continuously variable transmission comprising:
a hydraulic pump including a pump cylinder and a plurality of pump cylinder bores;
a hydraulic motor including a motor cylinder and a plurality of motor cylinder bores;
a cylinder block integrally formed by said hydraulic pump and said hydraulic motor;
a hollow output shaft;
a main oil supply passage formed within said hollow output shaft;
a high pressure oil passage disposed between the hydraulic pump and the hydraulic motor, said high pressure oil passage sending hydraulic oil to the hydraulic motor from the hydraulic pump during a normal operation of the transmission;
a low pressure oil passage disposed between the hydraulic pump and the hydraulic motor, said low pressure oil passage sending hydraulic oil to the hydraulic pump from the hydraulic motor during the normal operation, and wherein said high and low pressure passages, said hydraulic pump and said hydraulic motor form a hydraulic closed circuit having a hydraulic pressure;
a first pressure regulating valve for relieving the hydraulic pressure in the low pressure oil passage to the high pressure oil passage when the hydraulic pressure in the low pressure oil passage exceeds a predetermined value; and
a second pressure regulating valve for relieving the hydraulic pressure in the high pressure oil passage to the low pressure oil passage when the hydraulic pressure in the low pressure oil passage exceeds a predetermined value, wherein the first and the second pressure regulating valves are formed in the cylinder block in parallel with the pump and motor cylinder bores.

13. The hydrostatic continuously variable transmission according to claim 12, further comprising:
an inside annular groove formed on an outer peripheral surface of the output shaft, said inside annular groove partially forming said low pressure oil passage;
an outside annular groove formed on an outer peripheral surface of the cylinder block, said outside annular groove partially forming said high pressure oil passage; and
an annular partition wall formed between the inside annular groove and the outside annular groove.

14. The hydrostatic continuously variable transmission according to claim 13, further comprising:
a plurality of first valve bores formed in the annular partition wall;
a plurality of second valve bores formed in the annular partition wall;
a plurality of first distributor valves slidably fitted in said first valve bores; and
a plurality of second distributor valves slidably fitted in said second valve bores.

15. The hydrostatic continuously variable transmission according to claim 14, further comprising:
a plurality of eccentric rings surrounding said distributor valves; and
a plurality of expansion rings concentrically arranged with respect to said eccentric rings.

16. The hydrostatic continuously variable transmission according to claim 13, further comprising:
a first check valve for preventing hydraulic oil from reverse flowing from said inside annular passage to said main oil supply passage; and
a second check valve for preventing hydraulic oil from reverse flowing from said outside annular passage to said main oil supply passage.

* * * * *